May 15, 1951    M. VAN ANTWERPEN ET AL    2,552,912
DEVICE FOR FORMING CUSHIONING STRIPS
Filed Jan. 23, 1950      8 Sheets-Sheet 1

INVENTORS
MARTIN VAN ANTWERPEN
and LLOYD D. VAN ANTWERPEN
BY
ATTORNEYS

May 15, 1951

M. VAN ANTWERPEN ET AL 2,552,912

DEVICE FOR FORMING CUSHIONING STRIPS

Filed Jan. 23, 1950

INVENTORS
MARTIN VAN ANTWERPEN
and LLOYD D. VAN ANTWERPEN

BY

ATTORNEYS

May 15, 1951     M. VAN ANTWERPEN ET AL     2,552,912
DEVICE FOR FORMING CUSHIONING STRIPS Filed Jan. 23, 1950     8 Sheets-Sheet 6

INVENTORS
MARTIN VAN ANTWERPEN
and LLOYD D. VAN ANTWERPEN

ATTORNEYS

May 15, 1951  M. VAN ANTWERPEN ET AL  2,552,912
DEVICE FOR FORMING CUSHIONING STRIPS
Filed Jan. 23, 1950  8 Sheets-Sheet 7

INVENTORS
MARTIN VAN ANTWERPEN
and LLOYD D. VAN ANTWERPEN
BY
ATTORNEYS

May 15, 1951 M. VAN ANTWERPEN ET AL 2,552,912
DEVICE FOR FORMING CUSHIONING STRIPS
Filed Jan. 23, 1950 8 Sheets-Sheet 8

INVENTORS
MARTIN VAN ANTWERPEN
and LLOYD D. VAN ANTWERPEN
BY
ATTORNEYS

Patented May 15, 1951

2,552,912

UNITED STATES PATENT OFFICE 2,552,912

DEVICE FOR FORMING CUSHIONING STRIPS

Martin Van Antwerpen and Lloyd D. Van Antwerpen, Milwaukee, Wis.

Application January 23, 1950, Serial No. 140,132

12 Claims. (Cl. 154—32)

This invention appertains to a novel machine or machines for fabricating a cushioning and packaging strip for fragile articles such as glass panes, from sheets of paper or like fibrous material. In the Martin Van Antwerpen Patent No. 2,504,473, granted April 18, 1950, a complete automatic machine was disclosed for making such strips.

The present invention has for one of its objects to provide a semi-automatic machine, in which sets of material can be expeditiously inserted in place by an operator and then instrumentalities actuated by the operator in proper sequence for forming and securing the sheets together to bring about the correct and quick making of the cushioning and packaging material.

Another prime object of the invention is to provide a machine embodying a stationary press table or bed plate for receiving the first or base sheet and novel equidistantly spaced transversely extending forming bars for engaging (in one position) over the upper face of said sheet, the bars in this operative position being adapted to receive the second or intermediate sheet, and said machine also having novel equidistantly spaced transversely extending presser bars disposed between the forming bars for forming the second sheet about the forming bars and for holding said second sheet after forming against the first sheet until an adhesive, utilized to unite the first and second sheets together has set.

Another salient object of the invention is to provide novel means for forming and mounting the presser bars on the body of the machine, whereby said bars can be actuated by the operator in proper sequence to properly fold the second sheet step by step around the forming bars and whereby to permit movement of the second sheet relative to the first sheet and forming bars during the folding of said second sheet.

A further object of the invention is the provision of means for synchronously operating all of the forming bars to move the same into and out of operative relation with the first sheet and for simultaneously releasing the presser bars for operation and for moving a gate toward one longitudinal edge of the first sheet to prevent lateral shifting thereof.

A further important object of the invention is to provide means for preventing operation of the presser bars until the forming bars have moved to their operative position, said locking means also functioning to hold the presser bars against movement to a released position should an operator inadvertently endeavor to raise the forming bars before the release of the presser bars.

A still further object of the invention is to provide means for individually latching the presser bars against movement so that the operator will of necessity have to actuate each presser bar in a desired proper sequence.

A still further important object of the invention is to provide a second machine for receiving the united first and second sheets and for forming and uniting therewith a third or outer sheet.

A still further important object of the invention is to provide the second machine with forming bars for holding the third sheet in a raised, elevated position above the united first and second sheets and for then forming said third sheet about the forming bars and into engagement with the second sheet by the use of presser bars.

With these and other objects in view, the invention consists in the novel construction, arrangement and formation of parts, as will be hereinafter more specifically described and claimed, and illustrated in the accompanying drawing, in which drawings.

Figure 10:
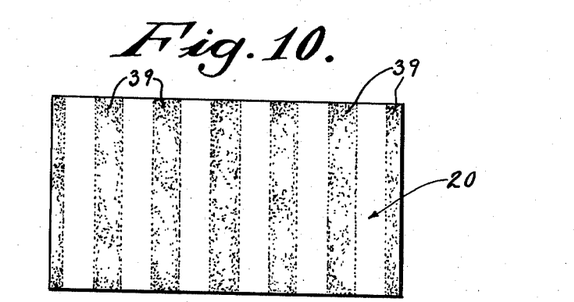
Figure 10 is a top plan view of the first or base sheet from which the cushioning strip is fabricated.
Figure 11:
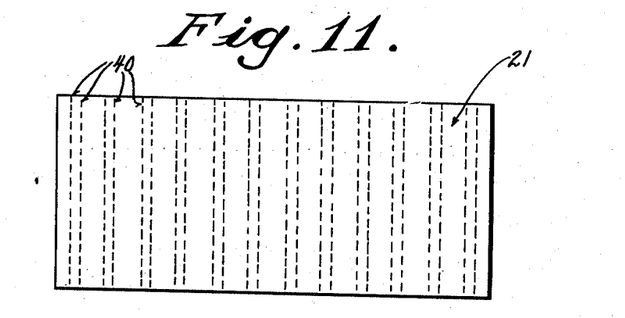
Figure 11 is a top plan view of the second or intermediate sheet from which the cushioning and packaging strip is fabricated.
Figure 12:
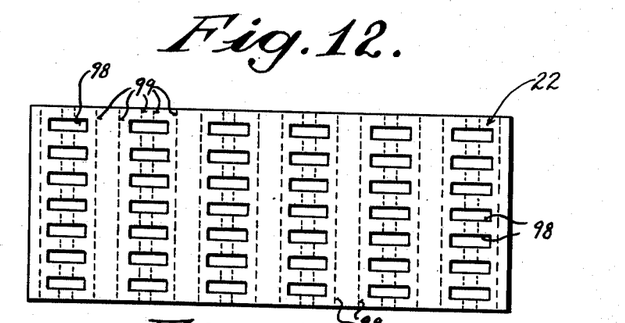
Figure 12 is a top plan view of the third or outer sheet from which the cushioning and packaging strip is fabricated.
Figure 13:
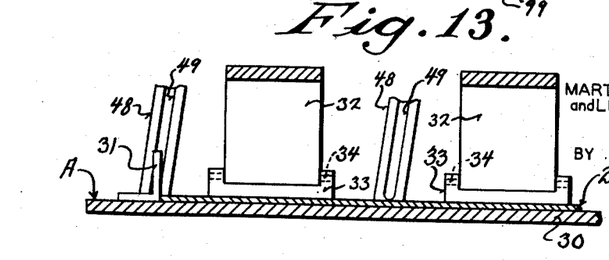
Figure 13 is an enlarged fragmentary detail longitudinal sectional view through the first machine and showing the first step in the fabrication of the cushioning and packaging strip, the first or base sheet being shown in position.

Referring to the drawings in detail, wherein similar reference characters designate corresponding parts throughout the several views, the letter A generally indicates our novel machine for receiving a base sheet 20 and for forming and connecting therewith a second or intermediate sheet 21 and the letter B generally indicates our second machine for receiving the formed and joined sheets 20 and 21 and for forming and securing thereto the third and final sheet 22. By referring to Figures 10, 11 and 12, it will be noted that the sheets 20, 21 and 22 are all of the same width, but that the sheet 21 is longer than sheet 20 and that sheet 22 is longer than sheet 21. The purpose of this will appear as the description proceeds.

Machine A

Machine A includes a supporting frame 23, of a strong and rugged nature, and this frame can be constructed in various manners, but as illustrated, the same includes upright supporting legs or standards 24. Securely bolted, or otherwise fastened to the legs 24, intermediate the ends thereof are spaced parallel longitudinally extending side beams 25. These beams are preferably, channel beams. These channel beams 25 form the main support for certain working parts of the machine. The upper terminals of the legs or standards are rigidly connected by longitudinally extending side brace beams 26, which also form supports for working parts of the machine. The frame is also braced in any other desired way, such as by longitudinally extending brace bars 27, and transversely extending brace bars 28. Secured to the upper face of the channel beams 25, are spaced, transversely extending supporting bars 29 and these bars in turn, have rigidly fastened thereto a bedplate or working table 30. The table preferably has a smooth flat top working surface and one end of the bedplate has secured to this upper face a transversely extending stop or gage bar 31, best shown in Figure 3, at the left, and in the enlarged views 13, 14 and 15. This table is adapted to receive the first sheet 20 and the left hand transverse edge of this sheet is adapted to closely abut the gage or stop bar 31.

Hingedly mounted on the frame at one side thereof are a plurality of equidistantly spaced forming bars 32. These bars are of a solid nature and extend transversely across the table in spaced relation thereto. While the bars 32 can be mounted in any preferred way for rocking or hinging movement, we have shown spaced brackets 33 rigidly secured to one of the channel beams 25 and pivot pins 34 are utilized to connect the forming bars with the brackets. These forming bars 32, as heretofore brought out extend entirely across the table 30 and the opposite ends thereof project beyond said table or bedplate. In fact, the ends of the forming bars 32 are provided beyond the hinge or pivot pins 34 with elongated working arms 35, the purpose of which will be described.

Figure 7:
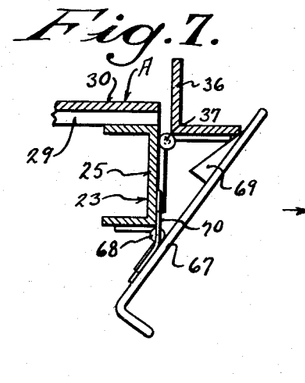
Figure 7 is an enlarged detail transverse sectional view taken on the line 7—7 of Figure 1, looking in the direction of the arrows showing the longitudinal gate in its operative position.
Figure 8:
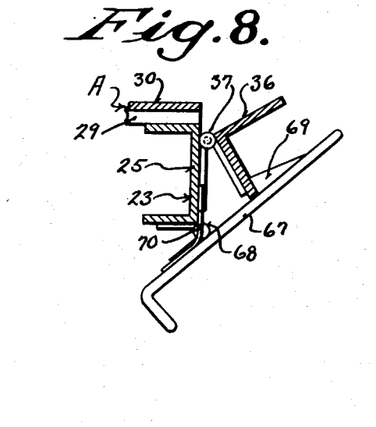
Figure 8 is a similar sectional view showing the longitudinal gate in its lowered inoperative position and held against movement by its holding latch.

The channel beam 25 opposite to the channel beam carrying the brackets 33, has connected thereto for swinging movement toward and away from the front longitudinal edge of the table, a longitudinally extending gate 36. Suitable hinges 37 can be employed for connecting the gate to the said channel beam 25. The gate 36 is preferably formed from angle iron and is movable to a raised operative position, as shown in Figure 7, and to a lowered inoperative position as shown in Figure 8. When the gate is in its raised position, the same extends above the table 30. When the forming bars 32 are in their lowered position parallel to the table 30 (see Figure 4), the said bars rest upon the upper edge of the gate 36, and in fact the gate can be notched as at 38, at spaced points for receiving the outer ends of the forming bars and hence the gate forms a support for these forming bars and prevents lateral shifting movement of the outer ends thereof. When the forming bars are in their raised, inoperative position (see Figure 5) then the bars are above the gate.

Figure 4:
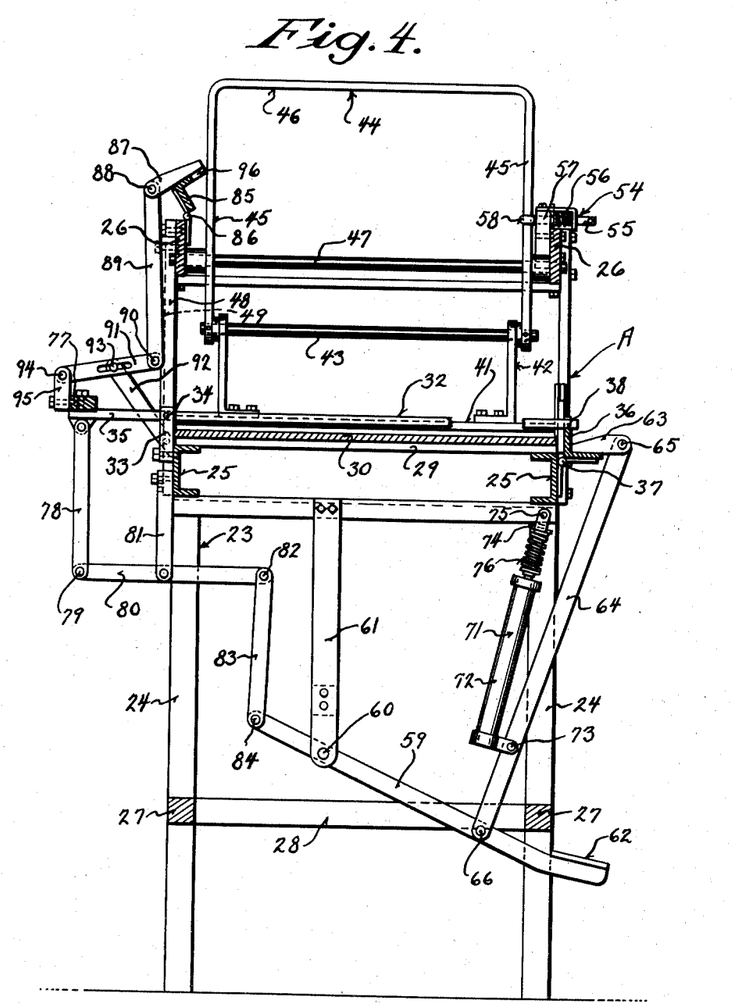
Figure 4 is a transverse sectional view through the machine, taken on the line 4—4 of Figure 1, looking in the direction of the arrows.
Figure 5:
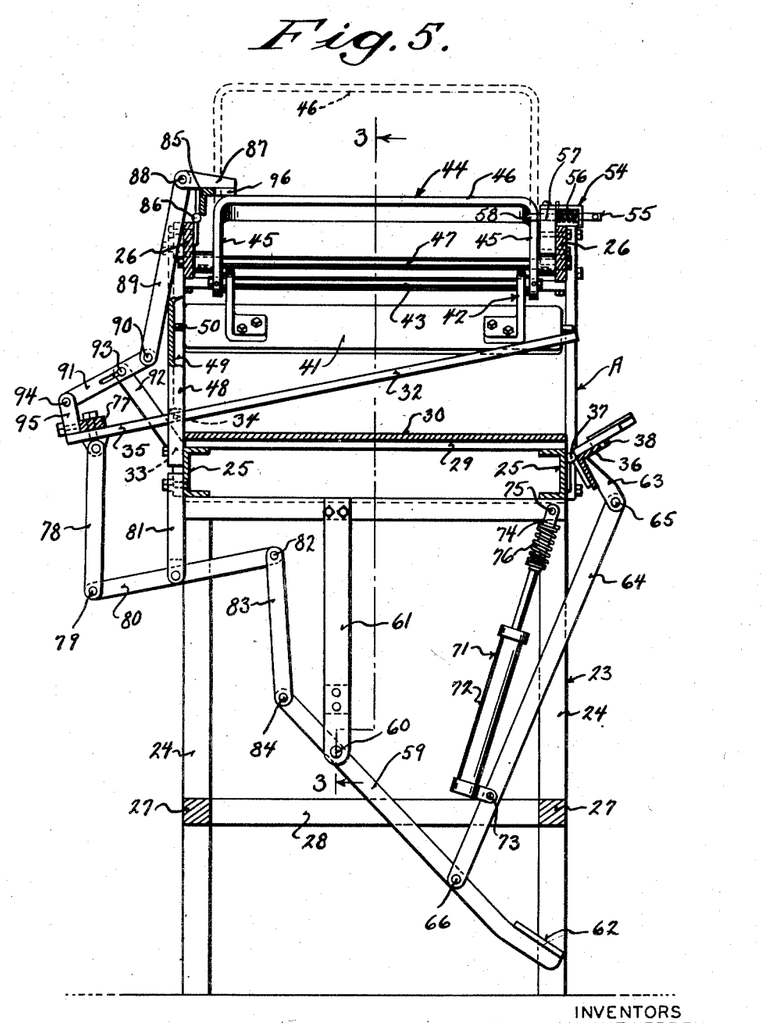
Figure 5 is a transverse sectional view through the machine, taken on the line 5—5 of Figure 3, looking in the direction of the arrows.
Figure 14:
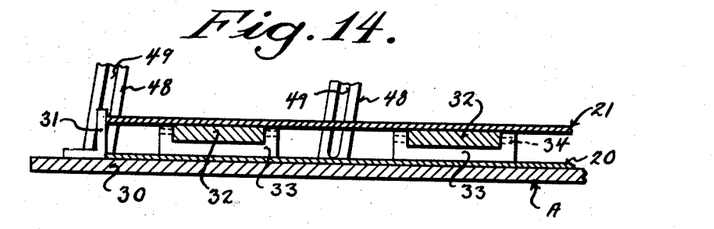
Figure 14 is a view similar to Figure 13, and showing the second step in the fabrication of the strip, the forming bars being shown in their lowered position and with the second or intermediate sheet placed thereon.
Figure 15:
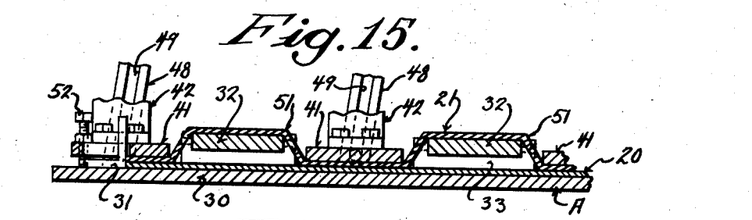
Figure 15 is a view similar to Figures 13 and 14, showing the third step in the fabrication of the strip with the presser feet in their lowered operative position.

From the description so far, in use of the machine, the first or base sheet 20 is slipped onto the table 30, with its front transverse edge engaging the gage or stop bar 31, and in this position the gate is in its lowered position as shown in Figure 5. The gate is now moved to its closed position as shown in Figure 4, and the forming bars are swung into their lowered position into engagement therewith, after which the second sheet 21 is placed on top of the forming bars, as best shown in Figure 14, with its front transverse edge against the stop and gage bar 31. The upper surface of the first or base sheet 20 is coated at spaced points with transverse stripes of a desired adhesive 39, and if preferred, the adhesive can be applied to this sheet after the same is placed on the table and the stripes of adhesive are disposed between the forming bars 32 and at the extreme transverse edges of the sheet. The second or intermediate sheet can be initially provided with spaced transversely extending rows 40 of score or like weakening lines, and these score lines are so placed as to lie on opposite sides of the forming bars, as the sheet 21 is formed about said bars into engagement with the base sheet 20, as will be also more fully set forth.

Figures 1, 6:
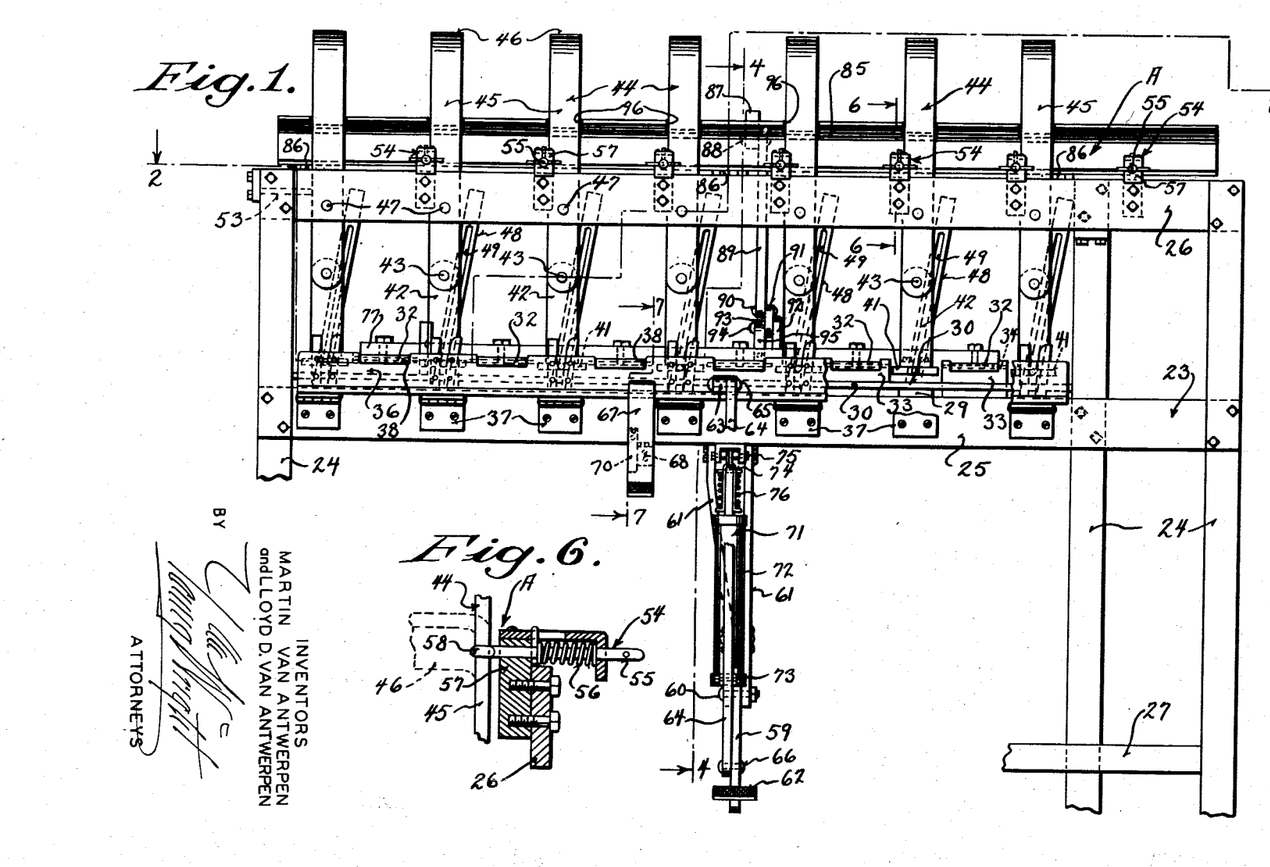
Figure 1 is a side elevational view of the first machine for forming and uniting the second sheet with the first sheet, parts of the figure being shown broken away, the machine being shown in this view in its operative position for forming and uniting the sheets.
Figure 6 is an enlarged detail transverse sectional view, taken on the line 6—6 of Figure 1, looking in the direction of the arrows, illustrating one of the latches for a presser foot or bar.

In order to form the sheet 21 about the forming bars and to forcibly hold the sheet during the forming thereof into firm bonding contact with the stripes of adhesive 39 on the base sheet, we provide a series of independently operable transversely extending presser bars or feet 41. These presser bars or feet 41 ride between the forming bars 32, see Figures 1, 3 and 15, but it is also to be noted that a presser bar or foot is arranged in front of the foremost forming bar 32 and that a preesser bar or foot is disposed in rear of the rearmost forming bar 32.

The bars or feet are bodily movable toward and away from the table 30. To bring about movement of the presser bars or feet, each of said bars have rigidly secured thereto upwardly extending right angularly disposed bracket arms 42 adjacent to their opposite ends, and the upper terminals of the bracket arms have pivotally connected thereto by means of pivot pins 43, an operating yoke 44. There is an operating yoke 44 for each presser foot and each yoke can be of an inverted U-shape in front elevation, see Figure 5, and hence each yoke includes spaced parallel legs 45 and a connecting cross bar or handle 46. The legs 45 are rockably mounted intermediate their ends for swinging movement on stub shafts 47, carried by the upper longitudinally extending beams 26. In order to effectively guide the presser bars or feet 41 toward and away from the table 30, guide bars 48 are provided for each foot. These bars are rigidly secured to the upper and lower longitudinal beams 25 and 26 and form a brace therefor. The guide bars 48 incline downwardly and forwardly toward the table and are provided with guide grooves 49, which are disposed at an acute angle to the vertical. The terminals of the presser bars or feet 41 are provided with guide pins 50 which ride in the grooves 49. By grasping a cross bar 46 and swinging the same toward the front of the machine, the presser foot connected therewith will be forcibly pushed down toward the table and at the same time will be given a limited forward pushing movement due to the guide pins 50 riding in the guide grooves 49. When the presser feet or bars 41, are in their complete lowered position (see Figure 1), the bracket arms 42 will be in parallel relation to the legs 45 of the operating yoke 44. Considering that the first or base sheet 20 has been placed in position on the table 30 and the former bars 32 lowered and the intermediate or second sheet 21 has been placed on top thereof, then the first presser foot is operated, i. e., the presser foot at the left (see Figure 3). As this foot moves down into engagement with the sheet 21 the same crowds and holds the sheet against gage bar, 31 and the front edge of the sheet down tight against the foremost adhesive stripe 39, and the sheet will be folded around the front edge of the foremost former bar 32. The presser feet are now operated one after the other from the left to the right (see Figure 3), and as each presser foot rides down between the former bars, the sheet 21 will be pushed forwardly and folded down around the former bars and held in engagement with the base sheet 20 between the former bars. Obviously, the sheet 21 must be of a longer length than the first sheet 20, in view of the folding thereof around the former bars to provide inverted cushioning V's 51 (see Figures 15 to 18, inclusive) and as the presser feet move downwardly and forwardly they tend to move the sheet 21 forwardly the correct desired distance to make the folds or V's. The presser bar at the extreme left and the presser bar at the extreme right (see Figure 3) carry adjustable set screws 52 for engaging the table in front of the front and rear transverse edges of the sheets 20 and 21, and these set screws prevent rocking or tilting of the feet.

Figure 2:
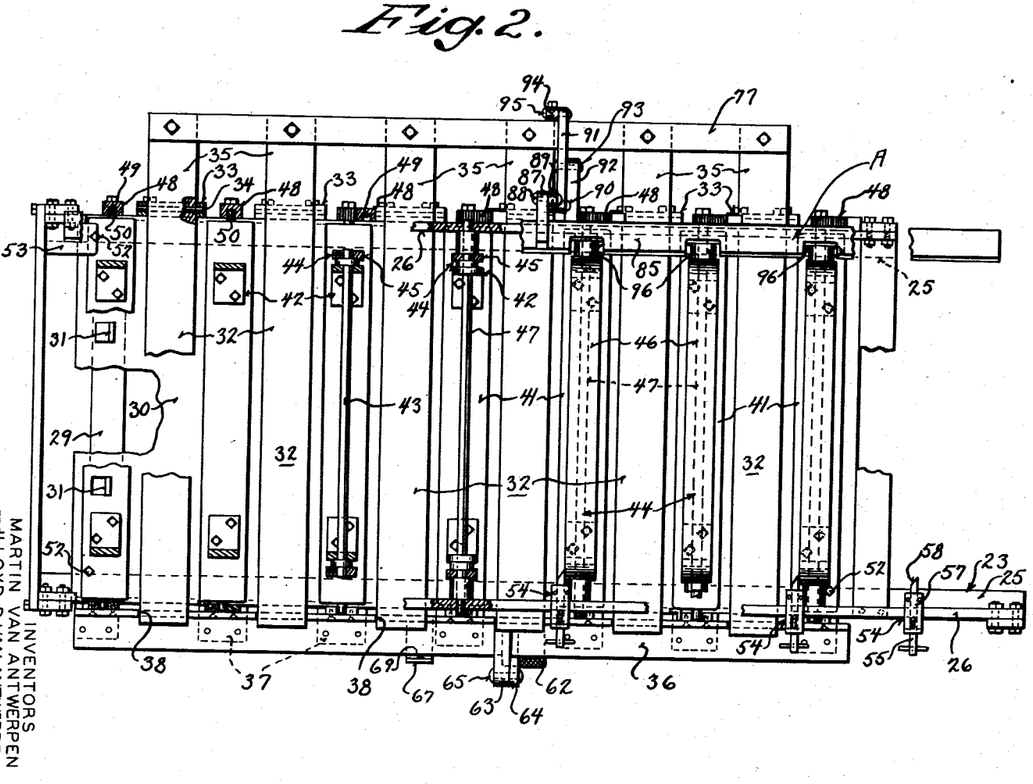
Figure 2 is a top plan view of the first machine with parts thereof broken away and in section, the parts in section being shown on the line 2—2 of Figure 1, looking in the direction of the arrows.
Figure 3:
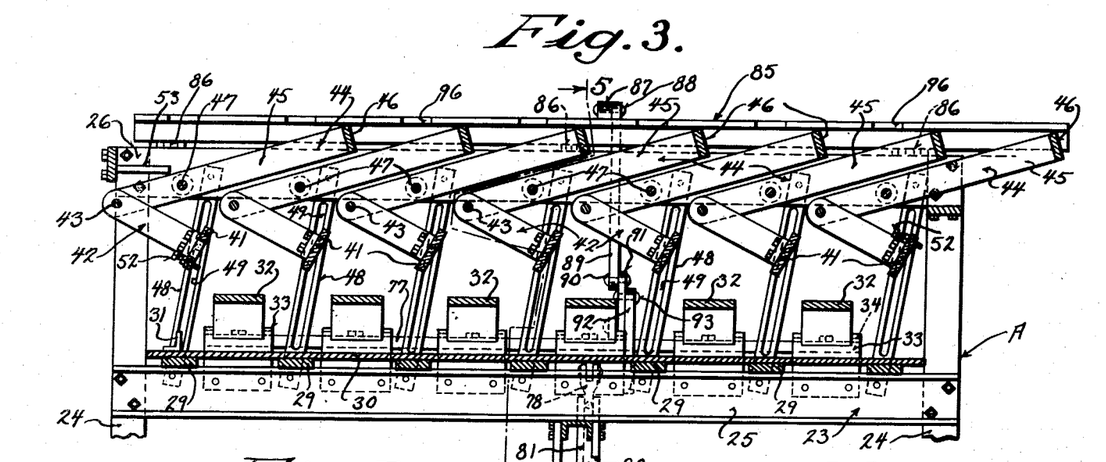
Figure 3 is a longitudinal sectional view through the upper part of the machine showing the various parts thereof in their released inoperative position for receiving the sheets, the section being taken on the line 3—3 of Figure 5, looking in the direction of the arrows.

To prevent the first yoke 44 from being swung too far to the left during the operation of the first presser foot, the frame of the machine can carry a stop plate 53, best shown at the left hand side of Figure 3. To limit the forward swinging movement of the other yokes beyond the desired, correct distance, a latch and stop device 54 is provided for each of the same. Each latch device 54 includes a sliding latch plunger 55 normally urged toward the yokes by expansion 56. The plungers 55 can be mounted for sliding movement in suitable brackets 57 rigidly fastened to one of the upper longitudinal beams 26. The inner ends of each latch plunger 55 has formed thereon a tapered latch nose 58. As the yokes are swung forwardly, the same will abut the flat sides of the plungers, as shown in Figure 2, and hence the yokes cannot be swung to the left beyond their vertical positions. After sheet 21 has been formed and secured to the sheet 20 and the adhesive has set, the yokes are operated one at a time from the right toward the left, and as a yoke is swung down toward the right, the same will strike an adjacent tapered face 58 of a plunger 55, and the plunger will be forced back against its spring to permit the yoke to ride past the same. After the yoke has ridden past the plunger, the plunger will spring back and hold the yoke against swinging movement to the left. Hence in operating the yokes to form the second sheet, each latch is manually pulled back and the yokes are held against inadvertent movement.

Novel means is provided for synchronously operating the gate 36 and all of the former bars 32 and this means includes a foot treadle lever 59 rockably mounted intermediate its ends as at 60, on a depending hanger bracket 61 secured to the frame of the machine. The outer end of the treadle lever 59 has secured thereto any desired type of foot pedal 62 and this foot pedal is arranged directly below the gate 36. The gate 36 has rigidly secured thereto a bracket 63 and a link 64 is pivotally connected to the bracket as at 65, and to the treadle lever 59 as at 66, forwardly of its pivot 60. Hence upon the pressing down of the pedal 62, the link will pull down on the gate 36 and swing the same to the position shown in Figure 8. To hold the gate in its lowered position against accidental movement, a latch lever 67 (see Figures 7 and 8) is rockably mounted intermediate its ends by a hinge 68 to one of the channel beams 25. The latch lever is provided with a latch nose 69 for engaging the gate in its lowered position. A leaf spring 70 is employed for normally urging the latch 67 and its nose 69 toward the gate, hence the latch automatically locks the gate in its lowered position upon the downward swinging movement thereof. The latch is manually actuated against the tension of the spring 70 when it is desired to release the gate. Means is provided for normally holding the treadle lever 59 in a raised position, and the gate 36 in its raised position, and a contractile coil spring can be provided for this purpose. As illustrated, a standard dashpot 71 is utilized. The same includes a cylinder 72 rockably connected as at 73 to the link 64 and a plunger rod 74 rockably mounted as at 75 on the frame of the machine. A cushioning spring 76 can be placed around the plunger rod 74 to limit the forcible raising of the gate.

As heretofore intimated, all of the former bars 32 are operated together and synchronously with the gate 36 and to bring about this, a longitudinally extending operating bar 77 is rigidly secured to the extended arms 35 of the former bars 32, and hence all of the former bars are rigidly connected together. Pivotally secured to one of the arms 35 is a link 78 and this link is in turn pivotally connected as at 79 to a double armed lever 80 which is rockably mounted intermediate its ends on a hanger bracket 81 rigidly secured to the frame of the machine. Also pivotally connected to the double armed lever 80, by means of a pivot pin 82, is a link 83 and this link is operatively connected to the treadle lever 59 in rear of its pivot 60 by means of a pivot pin 84. Upon the downward swinging movement of the treadle lever 59 the gate 36 will be lowered as described and the double armed lever 80 will be rocked by the link 83 and, the outer ends of the extended arms 35 of the former bars 32 will be pulled down by the link 78 and consequently said bars will be raised. The first sheet 20 can now be conveniently slipped on the table. After the sheet is placed in position, the latch 67 is manually operated and the gate will automatically swing to its closed position as shown in Figure 7 of the drawings, and the former bars will be lowered.

In order to prevent the operation of the presser feet or bars, by an inexperienced operator, when the former bars 32 are in a raised position, a lock is provided for the presser bars. This lock comprises a longitudinally extending lock bar 85 which is preferably formed from angle iron. The lock bar 85 is connected by means of hinges 86 to one of the upper frame beams 26, and is so hinged that one flange of the lock bar projects inwardly over the machine. This angle lock bar is operated in conjunction with the former bars 32 and the gate 36 and this is brought about through the following mechanism. Rigidly secured to the angle lock bar 85 is a bracket 87 and pivotally connected to the bracket as at 88, is a link 89. The lower end of the link, in turn, is pivoted as at 90, to a lever 91. The lever intermediate its ends is pivotally and slidably mounted on a bracket arm 92, as at 93. The end of the lever opposite to the pivot 90 is pivotally connected as at 94 to a bracket 95 secured to the connector bar 77, carried by the former bars 32. When the presser bars or feet 41 are in their raised position and the gate is swung open due to downward movement by the operator on the treadle lever 59, the lock angle bar 85 will be swung down forwardly over the machine as shown in Figure 5 over the yokes 44 of the presser bars and hence movement of these presser bars will be prevented. As the latch 67 is operated to release the gate 36, the treadle will return to its normal position and upon downward movement of the former bars 32, the link 89 will be pulled down and the angle lock bar will be raised, as shown in Figure 4, after which the yokes 44 for the presser feet or bars can be operated in the desired sequence.

It is to be also noted that the angle lock bar 85 is provided with equidistantly spaced notches 96 for a purpose which will now be described. Presuming that the yokes have been operated and the presser feet are in their lowered position, as shown in Figure 4, should an inexperienced operator operate the foot treadle 59 before releasing the yokes, then the angle lock bar 85 would be swung forwardly and the notches 96 would receive the adjacent arms 45 of the upright yokes and the yokes would be held against movement and the paper sheet could not be pulled out until the operator actuated the machine in the proper sequence of events.

After the forming of the second sheet 21 and the setting of the adhesive and the consequent uniting of the second sheet with the first sheet 20, these two united sheets are removed from the machine A as a unit. This is accomplished, by, as previously explained, moving the yokes 44 one at a time from the right to the left and then pressing down on the treadle lever 59. The gate 36 will be swung to its open position and the united sheets will be raised by the former bars 32 and the united sheets as a unit can be grasped by the operator and pulled laterally from off of the machine and the former bars. This unit is now ready to be placed on the machine B so that the third or outer sheet 22 can be formed and united therewith.

Machine B

The machine B is constructed identically the same as the machine A, and consequently the machine B will not be described in minute detail. The only difference between the machines A and B, is that the machine B is provided with relatively thick former bars indicated by the reference character 97. These former bars 97 are also disposed a greater distance from the table 30 than the former bars 32 in machine A for a purpose which will now appear.

Figure 9:
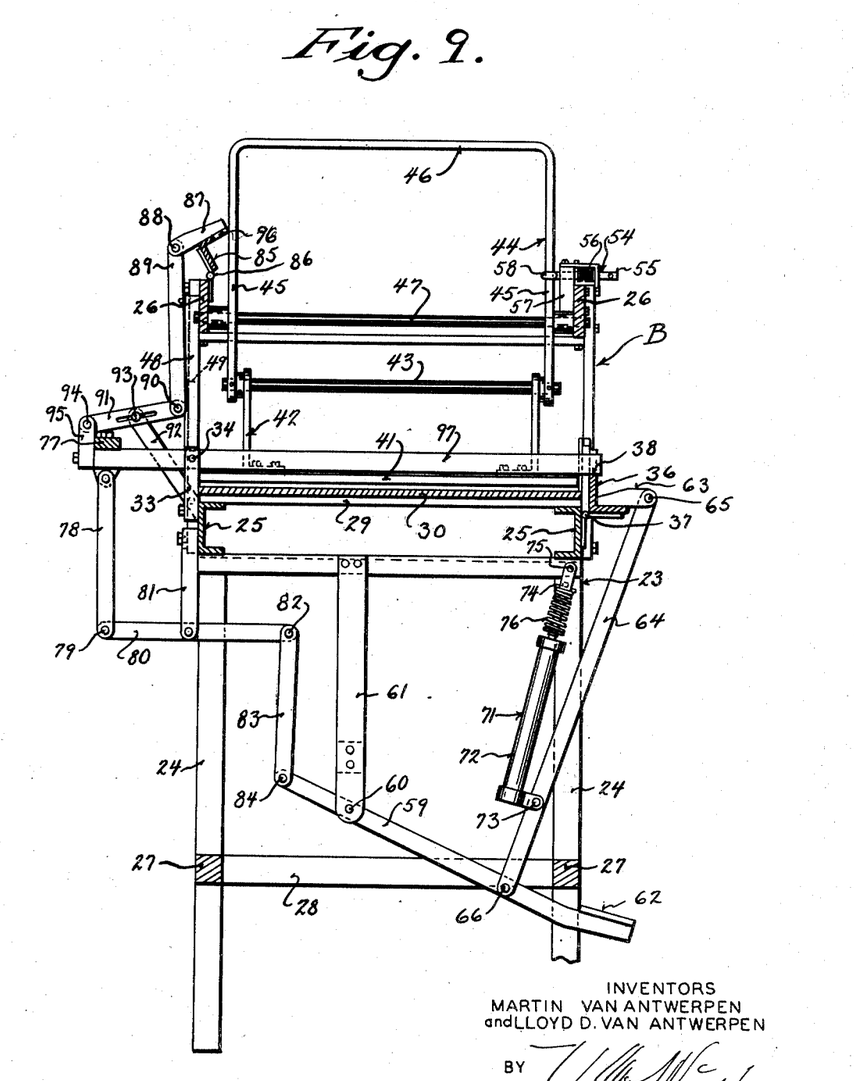
Figure 9 is a transverse sectional view through the second machine.
Figure 16:
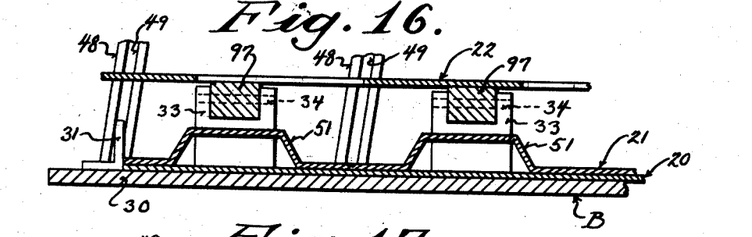
Figure 16 is an enlarged fragmentary longitudinal sectional view through the second machine and showing the fourth step in the fabrication of the strip, the united first and second sheet being shown in position with the forming bars in their lowered position and the third sheet placed thereon.
Figure 17:
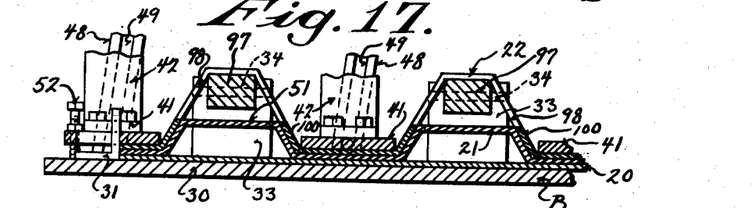
Figure 17 is a view similar to Figure 16, but showing the fifth and final step in the fabrication of the strip, the presser bars being shown in their lowered position for folding the outer or third sheet around the forming bars and in engagement with the second or intermediate sheet.

Considering that the former bars 97 of the machine B are in a raised position similar to the position of the former bars 32 in Figure 5, the united sheets 20 and 21 are slid as a unit laterally on the table 30, below the former bars and against the gage bar 31. After this, the former bars are moved to their lowered position, as shown in Figures 9, 16 and 17. The sheet 22 is now laid on top of the former bars 97 (see Figure 16). By examining this figure, it will be seen that the sheet 22 is held above the sheet 21, and the sheet 20, by the former bars and that said former bars are spaced from the inverted cushioning V's 51 of sheet 21. Machine B is now operated exactly the same way as machine A, namely, the presser foot at the extreme left hand of the machine is operated and the other presser feet from the left to the right. This will fold the sheet 22 around the former bars 97 and bring the portions of the sheet down between the former bars and against the upper surface of the intermediate sheet 21. By referring to Figure 12, it will be noted that sheet 22 is provided with transverse rows of slots 98 and transverse rows of score lines 99. The score lines 99 facilitate the breaking or the folding of the sheet 22 about the former bars. It is to be also noted that sheet 22 is longer than sheet 21, in order to allow for the forming of the large inverted V's 100 in the sheet 22 by the machine B. As in machine A, as the presser feet are operated one by one and moved forwardly and downwardly at an angle, the sheet is gradually crowded or moved toward the left of the machine and the sheet 22 will be properly formed. The V's 100 in sheet 22 overlie the V's 51, and the rows of slots 98 are so positioned that the same form notches in the V's 100 above the V's 51 in sheet 21. By lifting up the presser feet or bars and then permitting the raising of the former bars 97, the three united sheets can be pulled laterally from off of the machine B and the former bars 97.

Figure 18:
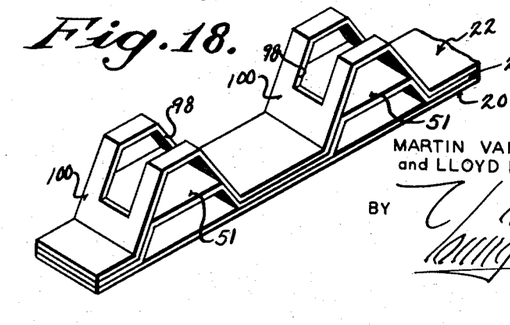
Figure 18 is a detail perspective view of the complete fabricated cushioning and packaging strip.

In actual practice, the three united sheets are cut longitudinally into strips and a fragment of one of these strips is shown in Figure 18.

From the foregoing description, it can be seen that we have provided a pair of comparatively inexpensive machines which will permit the expeditious fabricating of cushioning and packaging sheets, which can be divided into longitudinal strips.

Changes in details may be made without departing from the spirit or the scope of this invention, but what is claimed as new is:

1. A machine for fabricating a cushioning and packaging sheet comprising a flat bedplate adapted to receive a flat sheet of material, a transversely extending gage and stop bar for said sheet of material at one end of said table, a plurality of equidistantly spaced former bars rockably mounted relative to the bedplate for movement in a raised inoperative position at an angle to the bedplate and to a lowered operative position parallel to said bedplate above the first sheet, said former bars being adapted to support a second sheet above the bedplate and first sheet, means for synchronously actuating the former bars, and presser feet movable toward and away from said bedplate on opposite sides of the former bars, said presser bars being movable one at a time.

2. A machine for fabricating a cushioning and packaging sheet comprising a flat bedplate adapted to receive a flat sheet of material, a transversely extending gage and stop bar for said sheet of material at one end of said bedplate, a plurality of equidistantly spaced former bars rockably mounted relative to the bedplate for movement in a raised inoperative position at an angle to the bedplate and to a lowered operative position parallel to said bedplate above the first sheet, said former bars being adapted to support a second sheet above the bedplate and first sheet, means for synchronously actuating the former bars, presser feet movable toward and away from said bedplate on opposite sides of the former bars, said presser bars being movable one at a time, and said presser bars during their downward movement toward the bedplate being guided toward one transverse edge of the sheets.

3. A machine for fabricating a cushioning and packaging sheet comprising a flat bedplate adapted to receive a flat sheet of material, a gage and stop bar extending transversely across the bedplate for said sheet, equidistantly spaced former bars movable over said bedplate and said sheet in parallel relation thereto, said former bars being adapted to support a second sheet in spaced parallel relation to the first sheet, presser bars movable toward and away from the bedplate and said sheets between the former bars, means for independently actuating each of the presser feet, guides for said presser feet inclining all in the same direction toward one transverse edge of the bedplate, guide pins carried by the presser feet slidable in said guides, whereby upon downward movement of the presser feet the same will be moved slightly toward said mentioned transverse edge of the bedplate.

4. A machine for fabricating a cushioning and packaging sheet comprising a flat bedplate adapted to receive a sheet of material, a plurality of equidistantly spaced transversely extending former bars hingedly connected at one longitudinal edge of the bedplate for swinging movement toward and away from the bedplate, a gate hingedly mounted for swinging movement toward and away from the edge of the bedplate opposite to the pivot points of the former bars, said gate forming a rest for the former bars when said bars are in a lowered position parallel to the bedplate, said former bars being adapted to support a second sheet above the bedplate and the first sheet in spaced parallel relation thereto, a plurality of equidistantly spaced presser feet movable toward and away from the bedplate and said sheets between the former bars, and means for holding said presser feet against movement when the same are in one of their positions.

5. A machine for fabricating a cushioning and packaging sheet comprising a flat bedplate adapted to receive a sheet of material, a plurality of equidistantly spaced transversely extending former bars hingedly connected at one longitudinal edge of the bedplate for swinging movement toward and away from the bedplate, a gate hingedly mounted for swinging movement toward and away from the edge of the bedplate opposite to the pivot points of the former bars, said gate forming a rest for the former bars when said bars are in a lowered position parallel to the bedplate, said former bars being adapted to support a second sheet above the bedplate and the first sheet in spaced parallel relation thereto, a plurality of equidistantly spaced presser feet movable toward and away from the bedplate and said sheets between the former bars, means for holding said presser feet against movement when the same are in one of their positions, and means for synchronously operating the gate and the former bars.

6. A machine for fabricating a cushioning and packaging sheet comprising a flat bedplate adapted to receive a sheet of material, a plurality of equidistantly spaced transversely extending former bars hingedly connected at one longitudinal edge of the bedplate for swinging movement toward and away from the bedplate, a gate hingedly mounted for swinging movement toward and away from the edge of the bedplate opposite to the pivot points of the former bars, said gate forming a rest for the former bars when said bars are in a lowered position parallel to the bedplate, said former bars being adapted to support a second sheet above the bedplate and the first sheet in spaced parallel relation thereto, a plurality of equidistantly spaced presser feet movable toward and away from the bedplate and said sheets between the former bars, means for holding said presser feet against movement when the same are in one of their positions, and means for synchronously operating the gate, the former bars and the means for locking the presser feet.

7. A machine for fabricating a cushioning and packaging unit comprising a flat bedplate adapted to receive a sheet of material, a hinged gate carried for movement toward and away from said bedplate for preventing lateral shifting of the sheet when the gate is in a raised operative position, a plurality of equidistantly spaced transversely extending former bars hingedly mounted for swinging movement adjacent to the longitudinal edge of the bedplate remote from the gate, said former bars being movable into engagement with the gate and in spaced parallel relation to the bedplate, said former bars being adapted to support a second sheet in spaced parallel relation to the bedplate and the first sheet, individually operable presser feet arranged transversely of the bedplate and movable toward and away from the bedplate and the sheets between said former bars, and means for individually locking the presser feet against movement in one direction.

8. A machine for fabricating a cushioning and packaging unit comprising a flat bedplate adapted to receive a sheet of material, a hinged gate carried for movement toward and away from said bedplate for preventing lateral shifting of the sheet when the gate is in a raised operative position, a plurality of equidistantly spaced transversely extending former bars hingedly mounted for swinging movement adjacent to the longitudinal edge of the bedplate remote from the gate, said former bars being movable into engagement with the gate and in spaced parallel relation to the bedplate, said former bars being adapted to support a second sheet in spaced parallel relation to the bedplate and the first sheet, individually operable presser feet arranged transversely of the bedplate and movable toward and away from the bedplate and the sheets between said former bars, and means for individually locking the presser feet against movement in one direction, said means last named including a spring pressed latch plunger.

9. A machine for fabricating a cushioning and packaging unit comprising a flat bedplate adapted to receive a sheet of material, a plurality of equidistantly spaced transversely extending former bars movable over said bedplate in spaced parallel relation thereto and to the sheet, said former bars being adapted to support a second sheet in spaced parallel relation to the first sheet, presser feet movable toward and away from said bedplate between the former bars, inverted U-shaped yokes rockably mounted above the bedplate, means hingedly connecting the presser feet thereto, said presser feet being independently operable by their yokes, means for guiding the presser feet toward the bedplate, and a swinging lock bar movable into engagement with all of said yokes, when said yokes are moved downwardly to raise said feet.

10. A machine for fabricating a cushioning and packaging unit comprising a flat bedplate adapted to receive a sheet of material, a plurality of equidistantly spaced transversely extending former bars movable over said bedplate in spaced parallel relation thereto and to the sheet, said former bars being adapted to support a second sheet in spaced parallel relation to the first sheet, presser feet movable toward and away from said bedplate between the former bars, inverted U-shaped yokes rockably mounted above the bedplate, means hingedly connecting the presser feet thereto, said presser feet being independently operable by their yokes, means for guiding the presser feet toward the bedplate, a swinging lock bar movable into engagement with all of said yokes, when said yokes are moved downwardly to raise said feet, and means for synchronously operating the lock bar and the said former bars.

11. A machine for fabricating a cushioning and packaging unit comprising a flat bedplate adapted to receive a sheet of material, a plurality of equidistantly spaced transversely extending former bars movable over said bedplate in spaced parallel relation thereto and to the sheet, said former bars being adapted to support a second sheet in spaced parallel relation to the first sheet, presser feet movable toward and away from said bedplate between the former bars, inverted U-shaped yokes rockably mounted above the bedplate, means hingedly connecting the presser feet thereto, said presser feet being independently operable by their yokes, means for guiding the presser feet toward the bedplate, a swinging lock bar movable into engagement with all of said yokes, when said yokes are moved downwardly to raise said sheet, means for synchronously operating the lock bar and the said former bars, and means carried by certain of said presser feet for engaging the bedplate to prevent tilting thereof.

12. A machine for fabricating a cushioning and packaging unit comprising a flat bedplate adapted to receive a sheet of material, a swinging gate carried by said machine adjacent to one longitudinal edge of the bedplate movable to a raised position above said edge of the bedplate, a plurality of equidistantly spaced transversely extending former bars hingedly mounted adjacent to the opposite longitudinal edge of said bedplate, said former bars being movable to a raised inoperative position and to a lowered operative position into engagement with the gate when the gate is in its raised position, individually operable presser feet movable toward and away from the bedplate between the former bars, a foot treadle, means for operating the gate and the former bars from the foot treadle, means normally acting to hold the gate in its raised position and the former bars in their lowered position, and a spring pressed latch releasably engaging the gate when the same is in its lowered position for holding the gate and the former bars against movement.

MARTIN VAN ANTWERPEN.
LLOYD D. VAN ANTWERPEN.

REFERENCES CITED

The following references are of record in the file of this patent:

UNITED STATES PATENTS

| Number | Name | Date |
| --- | --- | --- |
| 2,047,584 | Harrap | July 14, 1936 |
| 2,058,334 | Mason | Oct. 20, 1936 |